(12) United States Patent
Hurlburt (10) Patent No.: US 6,402,170 B1
(45) Date of Patent: Jun. 11, 2002

(54) ENHANCED STEERING MECHANISM FOR UTILITY VEHICLES

(75) Inventor: Joseph C. Hurlburt, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/804,154

(22) Filed: Mar. 13, 2001

(51) Int. Cl.[7] .................................................. B62D 3/12
(52) U.S. Cl. ................ 280/103; 280/93.51; 280/93.514
(58) Field of Search ...................... 280/98, 103, 93.502, 280/93.51, 93.514

(56) References Cited

U.S. PATENT DOCUMENTS

| | | | |
|---|---|---|---|
| 4,706,770 A | 11/1987 | Simon | |
| 5,046,577 A | 9/1991 | Hurlburt | |
| 5,129,477 A | 7/1992 | Hurlburt | |
| 5,135,064 A | * 8/1992 | Ducote | .................. 280/103 |
| 6,089,340 A | 7/2000 | Galli | |
| 6,105,983 A | 8/2000 | Will | |
| 6,267,198 B1 | * 7/2001 | Hurlburt et al. | ............ 280/103 |
| 6,308,976 B1 | * 10/2001 | Mitchell | ..................... 280/98 |

\* cited by examiner

*Primary Examiner*—Brian L. Johnson
*Assistant Examiner*—Matthew Luby
(74) *Attorney, Agent, or Firm*—Larry W. Miller; John William Stader (57) ABSTRACT

A utility vehicle is provided with a steering mechanism that increases the turning angle of the steered wheels without requiring a lengthening of the wheel base of the vehicle. The steering mechanism includes a pair of bell cranks pivotally mounted to the steering axle of the vehicle. A tie rod extends between the two bell cranks to effect coordinated pivotal movement therebetween. A rack and pinion mechanism transfers manipulation of the operator's steering wheel to move the rack connected to the first bell crank and cause pivotal movement thereof. Each bell crank is associated with a steering link connected thereto at a connection point which moves on an arc centered on the respective pivot of the bell crank. The connection point moves forwardly with respect to the inner steered wheel to permit the steering arm of the inner steered wheel to rotate to an orientation that is substantially transverse to provide an enhanced turning angle for the inner steered wheel.

18 Claims, 6 Drawing Sheets

ENHANCED STEERING MECHANISM FOR UTILITY VEHICLES

FIELD OF THE INVENTION

The present invention relates generally to off-road motor vehicles, such as utility or recreational vehicles, and more particularly, to a steering mechanism that permits a decreased turning radius for the vehicle and enhanced steering precision.

BACKGROUND OF THE INVENTION

Small off-road vehicles such as utility or recreational vehicles are becoming popular for recreational and other general purpose off-road usage. Such utility vehicles can be found in U.S. Pat. No. 4,706,770. These utility vehicles have found usage on golf courses and at sporting events, and are particularly adaptable for utilization on a farm. This type of flexibility in the wide variety of uses necessitates a vehicle that is highly flexible, highly maneuverable and the like. This demands a vehicle that will afford a high degree maneuverability and ease of steering.

Steering characteristics of known utility vehicles provide poor turning performance. Known utility vehicles have turning clearance circles having a diameter greater than twenty-one feet. The use of independent front wheel suspension mechanisms on known utility vehicles, coupled with the mounting of the rack and pinion systems on the frame of the vehicle, introduces minor king pin rotations as the steering tires ride over ground undulations. Such construction reduces steering precision and can accelerate the wear of the tires on the steering axle.

Improved steering characteristics could be provided through an adaptation of the compound steering mechanism developed for agricultural tractors, as is shown in U.S. Pat. No. 5,129,477, issued to Joseph C. Hurlburt on Jul. 14, 1992. The adaptation of such a mechanism would require a lengthening of the wheel base of the utility vehicle. Lengthening of the wheel base results in increased shipping size and increased dealer set up labor, as well as increased manufacturing costs for the utility vehicle.

Placing a load on the utility vehicle typically results in a variation in the steering performance of known utility vehicles. For example, one known embodiment having a front steering axle, a rear drive axle, and a middle drive axle carries the load placed on the vehicle on the middle and rear axles, resulting in less weight on the steering axle and a reduction in maneuverability. Accordingly, known utility vehicle construction results in a significant influence on the steering performance by the load carried on the vehicle. Preferably, loads should not change the steering characteristics for any vehicle.

It is therefor desirable to provide an enhanced steering mechanism for utility and recreational vehicles that overcomes the disadvantages of the known prior art utility vehicles.

SUMMARY OF THE INVENTION

Accordingly, an important object of the present invention is to provide a steering mechanism that overcomes the above mentioned problems encountered in the prior art.

It is another object of this invention to provide a steering mechanism that enhances steering precision for utility vehicles.

It is a further object of this invention to provide a steering mechanism that decreases the turning radius for an off-road vehicle.

It is a further object of this invention that the inner clearance diameter for an off-road vehicle is reduced.

It is another object of this invention that steering angles are increased.

It is a feature of this invention to add a tie rod and two bell cranks to the steering system of a utility vehicle.

It is another feature of this invention that the enhanced steering geometry allows the steering angles to be increased to approximately 70° for the inner wheel.

It is an advantage of this invention that maneuverability is greatly increased.

It is a another advantage of this invention that oscillation induced steering is eliminated.

It is a further object of this invention to provide a steering mechanism for an off-road vehicle that is durable in construction, inexpensive to manufacture, carefree in maintenance, easy to assemble, and simple and effective in use.

These and other objects, features, and advantages are accomplished according to the present invention by providing a utility vehicle having a steering mechanism that increases the turning angle of the steered wheels without requiring a lengthening of the wheel base of the vehicle. The steering mechanism includes a pair of bell cranks pivotally mounted to the steering axle of the vehicle. A tie rod extends between the two bell cranks to effect coordinated pivotal movement therebetween. A rack and pinion mechanism transfers manipulation of the operator's steering wheel to move the rack connected to the first bell crank and cause pivotal movement thereof. Each bell crank is associated with a steering link connected thereto at a connection point which moves on an arc centered on the respective pivot of the bell crank. The connection point moves forwardly with respect to the inner steered wheel to permit the steering arm of the inner steered wheel to rotate to an orientation that is substantially transverse to provide an enhanced turning angle for the inner steered wheel.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
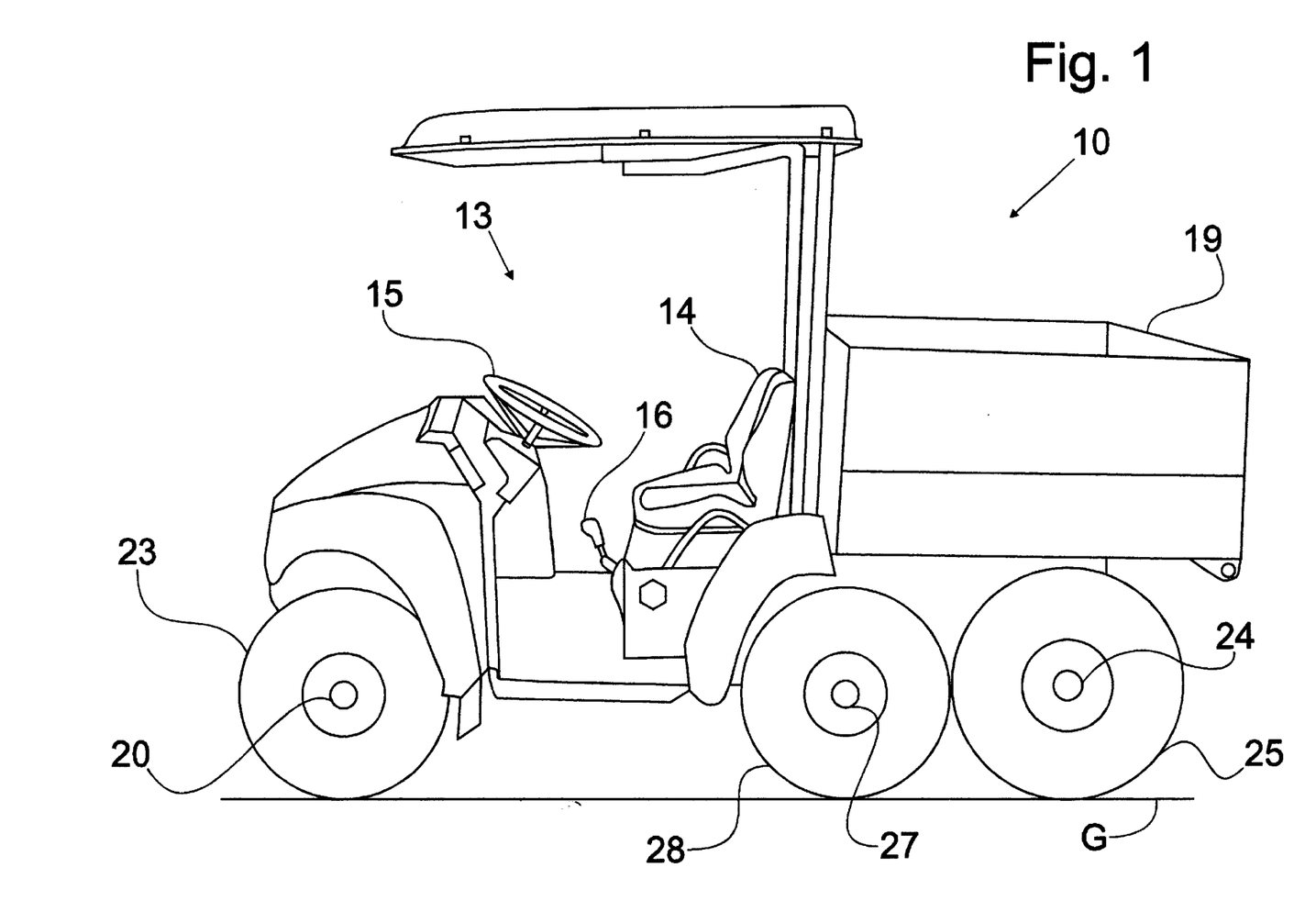
FIG. 1 is side perspective view of a utility vehicle incorporating the principles of the present invention.
Figure 2:
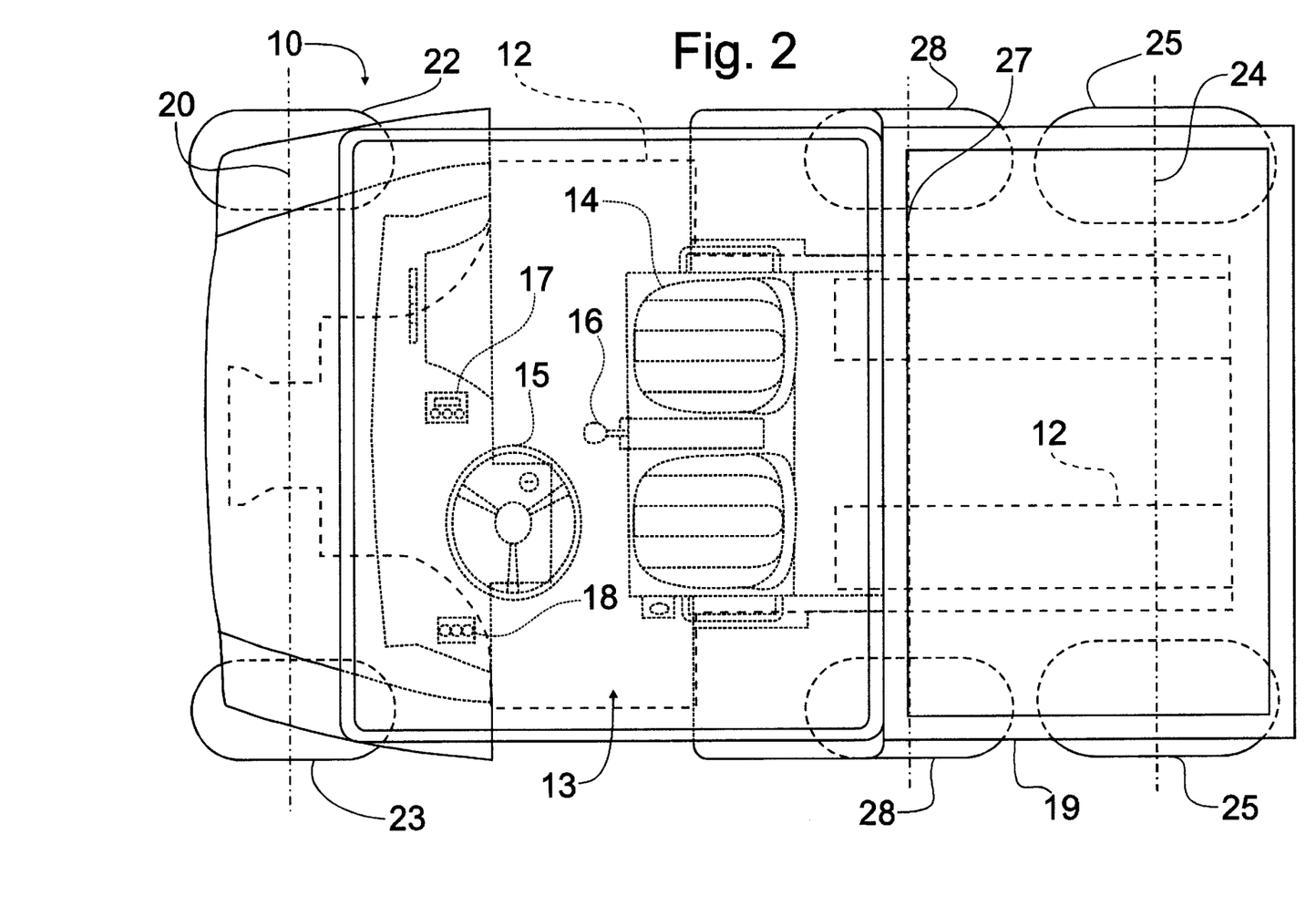
FIG. 2 is a top plan view of the utility vehicle of FIG. 1, the seats and control apparatus being shown in dashed lines, the frame and axles being shown in phantom.
Figure 3:
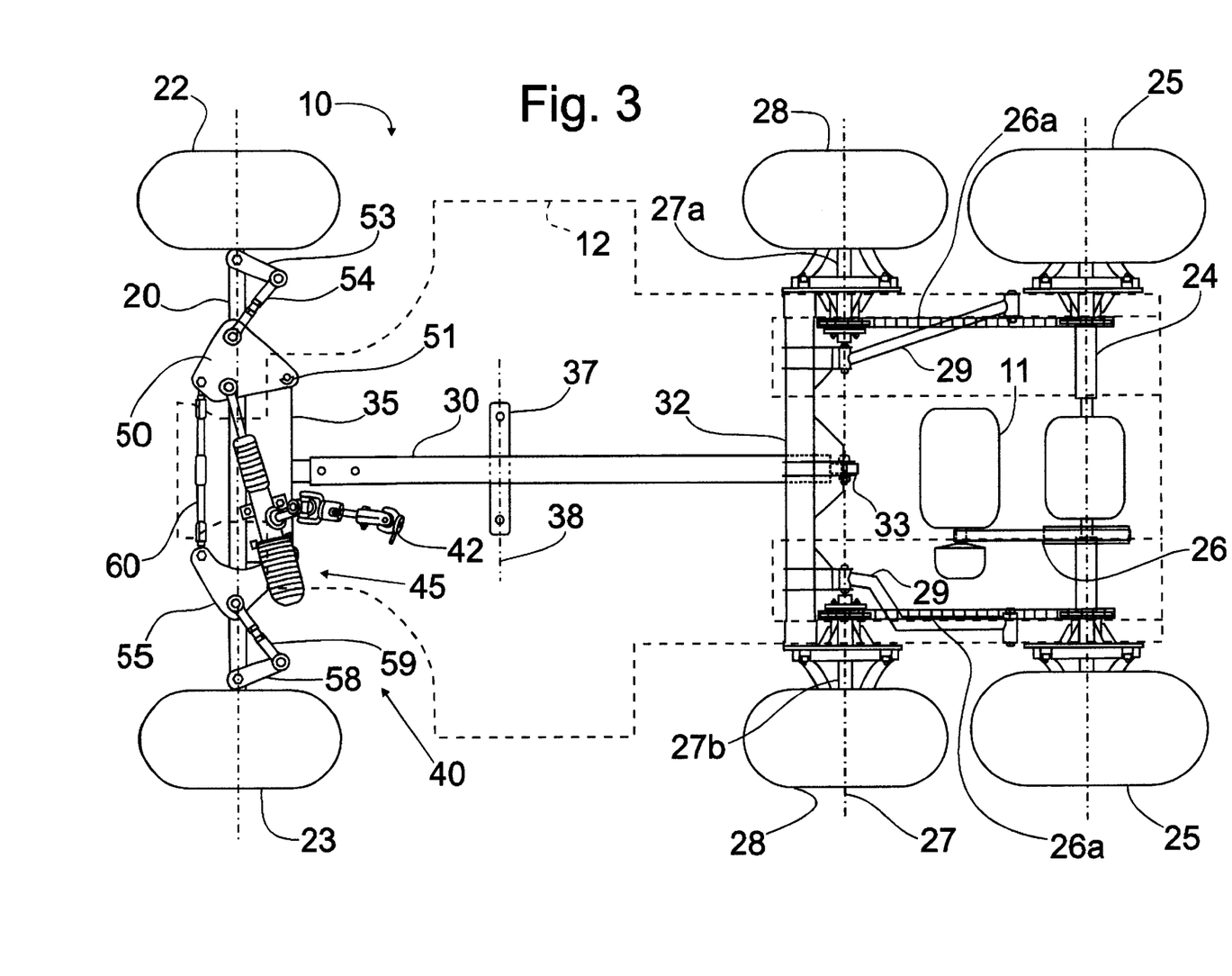
FIG. 3 is a top plan view of the frame and drive mechanism with the chassy removed for purposes of clarity.

Referring to FIGS. 1–3, a utility vehicle incorporating the principles of the present invention can best be seen. Any left and right references are used as a matter of convenience and are determined by standing at the rear of the vehicle and facing forwardly into the direction of travel.

The utility vehicle 10 includes a frame 12 supported above the ground G by a pair of steered wheels 22, 23 mounted on a front steering axle 20 and by a pair of driven wheels 25 mounted on a rear drive axle 24. In the preferred embodiment depicted in FIGS. 1–3, a middle drive axle 27 is also provided with a pair of opposing support wheels 28. The frame 12 supports an operator compartment 13 including seats 14 for the comfort of the operator and control apparatus, such as a conventional steering wheel 15 and a gear shift lever 16. A throttle control 17 and a brake control 18, along with other conventional control devices, are also included within the operator compartment 13 for the control of the vehicle 10. The frame 12 also supports a load bed 19 rearwardly of the operator compartment 13 over the middle and rear drive axles 27, 24 respectively, to carry cargo over the surface of the ground G.

Referring now to FIG. 3, the frame 12 with the axles 20, 24, 27 mounted thereon can best be seen. The rear drive axle 24 is fixed in rotation on the frame 12 and is powered by a drive mechanism 26 powered by an engine 11 supported by the frame 12. The middle axle 27 is pivotally supported from the frame 12 by a pair of support links 29 and is connected to the rearward end of a bogey beam 30, which will be described in greater detail below. The middle axle 27 is preferably formed as a pair of stub shafts 27a, 27b connected to said respective support links 29. A support beam 32 is pivotally mounted on a rearward end of the bogey beam 30 for oscillatory movement about a longitudinally extending pivot axis 33. The support wheels 28 on the middle axle 27 are driven by respective chain drives 26a to provide a four wheel drive capability for the vehicle 10.

The front steering axle 20 is pivotally attached to the forward end of the bogey beam 30 which is formed as a mounting member 35 for the steering axle 20. Similarly to the support beam 32, the front steering axle 20 is configured to oscillate about the longitudinally extending pivot axis 33 carried by the bogey beam 30 to provide the ability to accommodate ground undulations and the like. The bogey beam 30 is pivotally connected to the frame 12 by a pivot assembly 37 positioned beneath the operator compartment 13 to provide an oscillation of the bogey beam 30 about the transverse pivot axis 38. Accordingly, the front steering axle 20 and the middle axle 27 generally oscillate in opposing vertical directions on opposite ends of the bogey beam 30 due to the pivotal mounting thereof by the pivot assembly 37. The front steering axle 20 and the middle axle 27 are mounted for independent oscillation about the longitudinal axis 33 to allow all tires 22, 23, 25 and 28 to maintain contact with the ground G during operation of the utility vehicle 10.

The front steering axle 20 is operatively associated with a steering mechanism 40 to effect turning movement of the steered wheels 22, 23. The steering mechanism 40 is actuated through manipulation of the steering wheel 15 by the operator through the universal connecting linkage 42. The steering mechanism 40 includes a rack and pinion assembly 45 which includes a conventional pinion 46 rotatably associated with the steering wheel 15 and a conventional rack 47 that is linearly movable in conjunction with the rotation of the pinion 46 in a known manner. One skilled in the art will recognize that while the rack and pinion assembly 45 is a preferred steering apparatus for use in this utility vehicle 10, other known configurations of steering mechanisms 40 can also be utilized.

The rack 47 is pivotally connected to a first bell crank 50 at a first connection point 48. The first bell crank 50 is pivotally mounted on the mounting member 35 for movement about a pivot 51. The connection point 48 is positioned forwardly of the pivot 51 to effect pivotal movement of the first bell crank. The right steered wheel 22 includes a spuckle 52 having a steering arm 53 extending rearwardly therefrom. The first bell crank 50 is connected to the right steering arm 53 by a steering link 54 that extends laterally and rearwardly from the first bell crank 50 to the rearward end of the steering arm 53.

The steering mechanism 40 also includes a second bell crank 55 pivotally mounted on the mounting member 35 for movement about a pivot 56. The second bell crank 55 is connected to the first bell crank 50 by a tie rod 60 for coordinated movement therebetween. Accordingly, pivotal movement of the first bell crank 50 is transferred to the second bell crank 55 through connection with the tie rod 60. The left steered wheel 23 includes a spuckle 57 having a steering arm 58 extending rearwardly therefrom. The second bell crank 55 is connected to the left steering arm 58 by a steering link 59 that extends laterally and rearwardly from the second bell crank 55 to the rearward end of the steering arm 58. Accordingly, the left and right steered wheels 22, 23 are steered in concert with one another in response to a manipulation of the steering wheel 15 by the operator.

Figure 4:
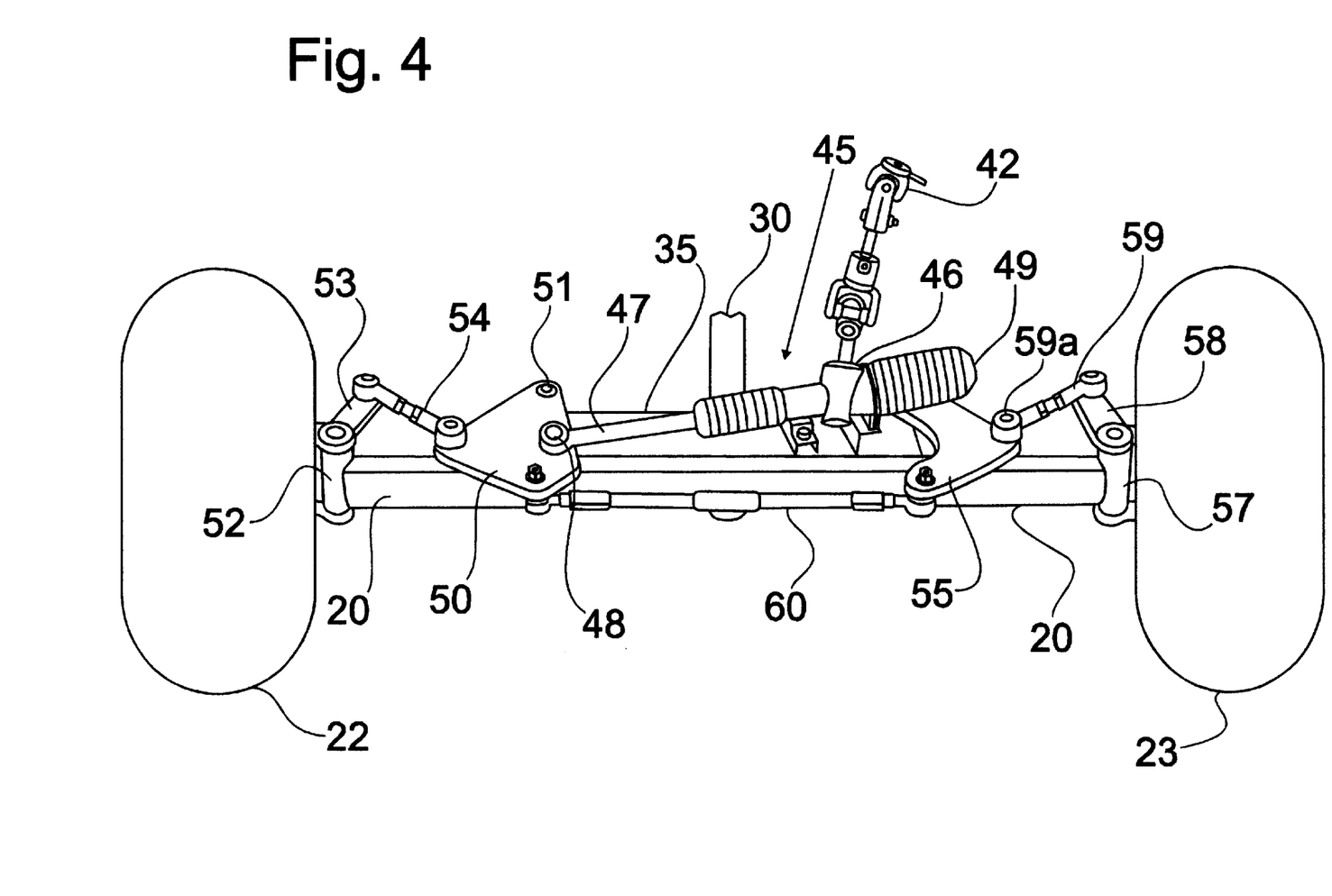
FIG. 4 is an enlarged front perspective view of the front axle depicting the steering mechanism of the present invention, the front wheels being shown in a non-steered orientation.
Figure 5:
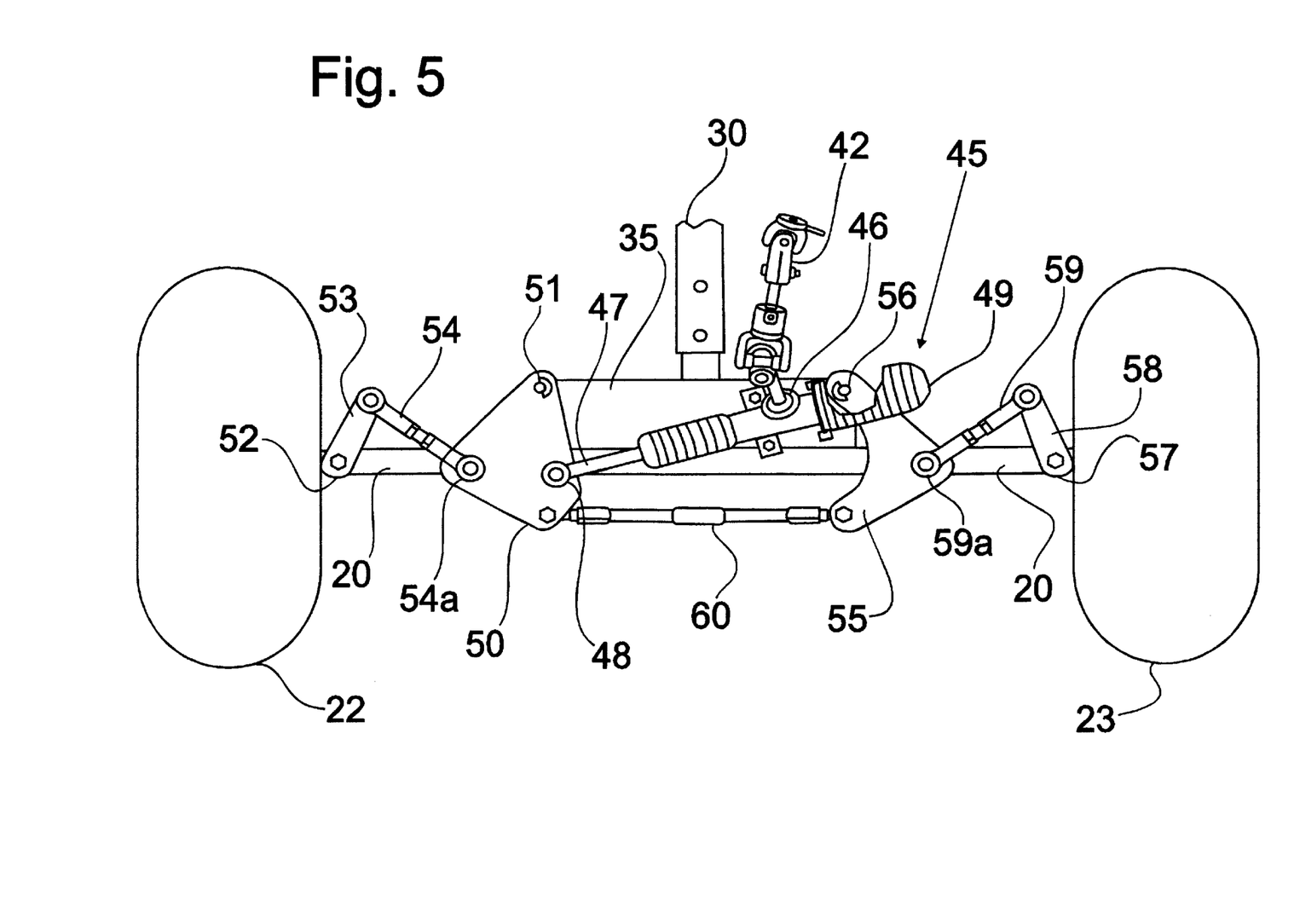
FIG. 5 is an enlarged top plan view of the front axle depicting the steering mechanism shown in FIG. 4.
Figure 6:
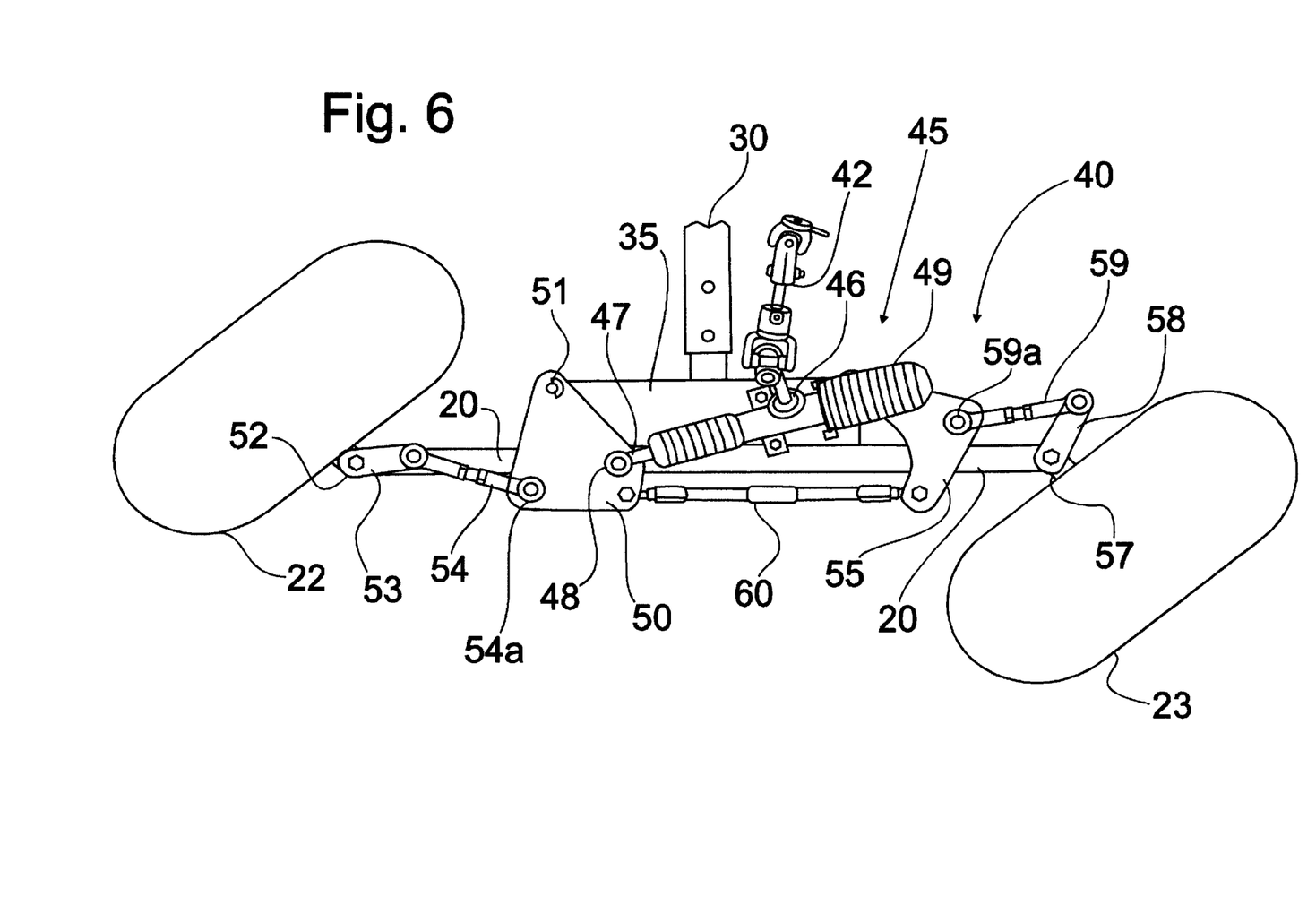
FIG. 6 is an enlarged top plan view of the front axle as shown in FIG. 5 with the front wheels being shown in a steered orientation.

The operation of the steering mechanism 40 can best be seen in FIGS. 4–6. The orientation of the steering mechanism 40 is depicted in FIGS. 4–5 in a non-turning configuration, while in FIG. 6, the steering mechanism 40 has been manipulated to effect a full right-hand turn. In FIG. 6, the right steered wheel 22 becomes the inner steered wheel with respect to the direction of turning, while the left steered wheel can be referred to as the outer steered wheel. One of ordinary skill in the art will readily recognize that a left turn would result in an opposite identification of the inner and outer steered wheels.

Comparing the orientation of the steering mechanism 40 in FIG. 5 and FIG. 6, it can be seen that the retraction of the rack 47 into the protective boot 49 draws the first bell crank 50 toward the center of the vehicle 10 about its pivot 51. As a result, the connection point 54a of the steering link 54 to the first bell crank 50 moves forwardly on an arc centered on the pivot 51 and pulls the steering link 54 toward the center of the vehicle 10. Since the steering arm 53 is fixed to the spuckle 52, the steering arm 53 is rotated to a near transverse orientation, resulting in a pivotal movement of the right steered wheel 22. The enhanced turning angle of the inner steered wheel 22, as depicted in FIG. 6, is enabled by the forward movement of the connection point 54a which draws the steering arm 53 through a greater angle of rotation than can be obtained by a conventional connection of the rack 47 directly to the steering arm 53. The steering link 54 maintains a rearwardly extending orientation throughout the entire range of motion of the first bell crank 50.

The outer steered wheel is represented in FIG. 6 as the outer left steered wheel 23. The second bell crank 55 is rotated about its pivot 56 in response to the pivotal movement of the first bell crank 50. The arrangement of parts effects a pivotal movement of the left steering arm 58 to pivot the outer steered wheel 23 in concert with the inner steered wheel 22. The positioning of the pivots 51, 56 and the connection points 54a, 59a of the steering links 54, 59 to the bell cranks 50, 55 is such that the outer steered wheel rotates through a steering angle less than the steering angle of the inner steered wheel. For the configuration depicted in FIGS. 4–6, the steering angle of the inner steered wheel is approximately 70°, while the steering angle of the outer steered wheel is approximately 48.5° to effect a proper turning movement of the utility vehicle 10.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In a utility vehicle having a frame supported by a steering axle having a pair of steered wheels pivotally mounted thereon, and a drive axle having a pair of drive wheels mounted thereon; an operator compartment including a control apparatus operably connected to a steering mechanism controlling the pivotal movement of the steered wheels relative to the steering axle, the improvement comprising:

the steering mechanism includes:
a steering apparatus operably supported on the steering axle for movement in response to a movement of the control device;
a first wheel control linkage pivotally connected to a mounting member for movement relative to said steering axle at a first pivot point, said first wheel control linkage being connected to said steering apparatus at a first connection point for pivotal movement of said first wheel control linkage in response to movements of said steering apparatus, said first wheel control linkage being connected to a first steered wheel by a first steering link for effecting pivotal movement of said first steered wheel, said first steering link extending rearwardly from said first wheel control linkage to the corresponding said steered wheel;
a second wheel control linkage pivotally connected to said mounting member for movement relative to said steering axle at a second pivot point, said second wheel control linkage being connected to said first wheel control linkage for pivotal movement in concert therewith, said second wheel control linkage being connected to a second steered wheel by a second steering link for effecting pivotal movement of said second steered wheel, said second steering link extending rearwardly from said second wheel control linkage to the corresponding said steered wheel, said first connection point being spaced longitudinally of said first and second pivot points; and
a tie rod interconnecting said first and second wheel control linkages to transfer pivotal motion from said first wheel control linkage to said second wheel control linkage.

2. The utility vehicle of claim 1, wherein said first and second wheel control linkages are bell cranks.

3. The utility vehicle of claim 2, wherein said steering apparatus is a rack and pinion apparatus with said rack being connected to said first bell crank.

4. The utility vehicle of claim 3, wherein said steering link is pivotally connected to the corresponding bell crank at a second connection point and to a steering arm on the corresponding said steered wheel at a third connection point, said second connection point moving forwardly to maintain a position forwardly of the corresponding said third connection point due to the pivotal movement of said bell crank when associated with an inner steered wheel.

5. The utility vehicle of claim 4, wherein said steering links remain angled rearwardly from said corresponding bell crank throughout the entire range of pivotal movement of the bell cranks.

6. The utility vehicle of claim 5, wherein said steering arm associated with an inner steered wheel is capable of being oriented substantially transversely when in a full steered position at said inner steered wheel.

7. The utility vehicle of claim 2, wherein said tie rod is located forwardly of said first connection point.

8. A steering mechanism for a utility vehicle having a steering axle including a pair of steered wheels pivotally mounted at opposing ends thereof, comprising:

a steering apparatus movably supported on said steering axle and being connected to a control device for moving said steering apparatus in response to a movement of the control device;
a first bell crank pivotally connected to a mounting member for movement relative to said steering axle and connected to said steering apparatus for pivotal movement of said first bell crank in response to movements of said steering apparatus, said first bell crank being connected to a first steered wheel by a first steering link for effecting pivotal movement of said first steered wheel;
a second bell crank pivotally connected to said mounting member for movement relative to said steering axle and connected to said first bell crank for pivotal movement in concert therewith, said second bell crank being connected to a second steered wheel by a second steering link for effecting pivotal movement of said second steered wheel;
a tie rod interconnecting said first and second bell cranks to transfer pivotal motion from said first bell crank to said second bell crank; and
a steering link pivotally connected to each respective said bell crank at a first connection point and to a steering arm on the corresponding said steered wheel at a second connection point, said first connection point moving forwardly to maintain a position forwardly of the corresponding said second connection point due to the pivotal movement of said bell crank when associated with an inner steered wheel.

9. The steering mechanism of claim 8, wherein said steering links remain angled rearwardly from said corresponding bell crank throughout the entire range of pivotal movement of the bell cranks.

10. The steering mechanism of claim 9, wherein said steering arm associated with an inner steered wheel is capable of being oriented substantially transversely when in a full steered position at said inner steered wheel.

11. The steering mechanism of claim 10 wherein said steering apparatus is a rack and pinion mechanism with said rack being connected to said first bell crank and said pinion being rotated in conjunction with the operation of said control device.

12. The steering mechanism of claim 11, wherein said first bell crank is connected to said rack at a mounting point positioned forwardly of a pivot point connecting said first bell crank for movement relative to said steering axle.

13. In a utility vehicle having a frame supported by a steering axle having a pair of steered wheels pivotally mounted thereon, and a drive axle having a pair of drive wheels mounted thereon; an operator compartment including a control apparatus operably connected to a steering mechanism controlling the pivotal movement of the steered wheels relative to the steering axle, the improvement comprising:

the steering mechanism includes:

a steering apparatus operably supported on the steering axle for movement in response to a movement of the control device;

a first wheel control linkage pivotally connected to a mounting member for movement relative to said steering axle at a first pivot point, said first wheel control linkage being connected to said steering apparatus for pivotal movement of said first wheel control linkage in response to movements of said steering apparatus, said first wheel control linkage being connected to a first steered wheel by a first steering link for effecting pivotal movement of said first steered wheel;

a second wheel control linkage pivotally connected to said mounting member for movement relative to said steering axle at a second pivot point, said second wheel control linkage being connected to said first wheel control linkage for pivotal movement in concert therewith, said second wheel control linkage being connected to a second steered wheel by a second steering link for effecting pivotal movement of said second steered wheel, said first connection point being spaced longitudinally of said first and second pivot points; and a tie rod located forwardly of a first connection point and interconnecting said first and second wheel control linkages to transfer pivotal motion from said first wheel control linkage to said second wheel control linkage.

14. The utility vehicle of claim 13, wherein said first and second wheel control linkages are bell cranks.

15. The utility vehicle of claim 14, wherein said steering apparatus is a rack and pinion apparatus with said rack being connected to said first bell crank.

16. The utility vehicle of claim 15, wherein said steering link is pivotally connected to the corresponding bell crank at a second connection point and to a steering arm on the corresponding said steered wheel at a third connection point, said second connection point moving forwardly to maintain a position forwardly of the corresponding said third connection point due to the pivotal movement of said bell crank when associated with an inner steered wheel.

17. The utility vehicle of claim 16, wherein said steering links remain angled rearwardly from said corresponding bell crank throughout the entire range of pivotal movement of the bell cranks.

18. The utility vehicle of claim 17, wherein said steering arm associated with an inner steered wheel is capable of being oriented substantially transversely when in a full steered position at said inner steered wheel.

* * * * *